(12) United States Patent
Marsh et al.

(10) Patent No.: US 9,029,461 B2
(45) Date of Patent: *May 12, 2015

(54) ALIPHATIC POLYESTER COATING COMPOSITIONS CONTAINING TETRAMETHYL CYCLOBUTANEDIOL

(75) Inventors: Stacey James Marsh, Church Hill, TN (US); Angela Hartley Honeycutt, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/367,190

(22) Filed: Feb. 6, 2009

(65) Prior Publication Data

US 2010/0204401 A1 Aug. 12, 2010

(51) Int. Cl.

| C08G 63/137 | (2006.01) |
|---|---|
| C08G 63/16 | (2006.01) |
| C08G 18/79 | (2006.01) |
| C08G 63/199 | (2006.01) |
| C08G 63/20 | (2006.01) |
| C09D 167/00 | (2006.01) |
| C09D 175/06 | (2006.01) |
| C09D 7/12 | (2006.01) |
| C09D 167/02 | (2006.01) |
| C08G 18/42 | (2006.01) |
| C08G 18/72 | (2006.01) |
| C08K 3/00 | (2006.01) |
| C08K 5/29 | (2006.01) |
| C08K 5/3477 | (2006.01) |
| C08K 5/3492 | (2006.01) |
| C08L 33/06 | (2006.01) |

(52) U.S. Cl.
CPC .............. *C08G 63/16* (2013.01); *C09D 167/02* (2013.01); *C08G 18/423* (2013.01); *C08G 18/4241* (2013.01); *C08G 18/72* (2013.01); *C08L 2666/18* (2013.01); *C08G 18/4238* (2013.01); *C08G 18/792* (2013.01); *C08G 63/199* (2013.01); *C08G 63/20* (2013.01); *C08K 3/0033* (2013.01); *C08K 5/29* (2013.01); *C08K 5/3477* (2013.01); *C08K 5/34922* (2013.01); *C08L 33/062* (2013.01); *C09D 167/00* (2013.01); *C09D 175/06* (2013.01); *C09D 7/1233* (2013.01)

(58) Field of Classification Search
USPC .................................. 524/356, 502, 539, 560
See application file for complete search history.

(56) References Cited

U.S. PATENT DOCUMENTS

| 2,891,930 A | 6/1959 | Caldwell et al. |
|---|---|---|
| 3,227,764 A | 1/1966 | Martin et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,538,187 A | 11/1970 | Feltzen |
| 3,789,044 A | 1/1974 | Taft et al. |
| 3,856,830 A | 12/1974 | Kuehn |
| 4,074,061 A | 2/1978 | Musser |
| 4,076,766 A | 2/1978 | Simms |
| 4,267,279 A * | 5/1981 | Howell ............................ 525/17 |
| 4,299,933 A | 11/1981 | McConnell et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,480,077 A | 10/1984 | Hefner, Jr. |
| 4,525,504 A | 6/1985 | Morris et al. |
| 4,525,544 A | 6/1985 | Nelson et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,859,760 A | 8/1989 | Light, Jr. et al. |
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |
| 5,023,367 A | 6/1991 | Calbo, Jr. et al. |
| 5,025,086 A | 6/1991 | Blount, Jr. et al. |
| 5,097,006 A | 3/1992 | Kapilow et al. |
| 5,124,388 A | 6/1992 | Pruett et al. |

(Continued)

FOREIGN PATENT DOCUMENTS

| BE | 615850 | 7/1962 |
|---|---|---|
| EP | 1647564 | 4/2006 |

(Continued)

OTHER PUBLICATIONS

P. R. Couchman. "Compositional Variation of Glass-Transition Temperatures. 2. Application of the Thermodynamic Theory to Compatible Polymer Blends." Macromolecules 1978, 11(6), 1156-1161.*

(Continued)

*Primary Examiner* — Richard A Huhn

(74) *Attorney, Agent, or Firm* — Jennifer R. Knight; Eric D. Middlemas

(57) ABSTRACT

Disclosed are aliphatic polyester resins containing 2,2,4,4-tetramethyl-1,3-cyclo-butanediol and solvent borne, thermosetting coating compositions prepared therefrom. The aliphatic polyesters exhibit good hardness and flexibility when formulated into thermosetting coatings compositions.

15 Claims, No Drawings

(56) References Cited

U.S. PATENT DOCUMENTS

| | | | |
|---|---|---|---|
| 5,160,792 A | | 11/1992 | Barbee et al. |
| 5,245,002 A | | 9/1993 | Kuo |
| 5,254,637 A | | 10/1993 | Witzeman et al. |
| 5,256,759 A | | 10/1993 | Kuo |
| 5,256,761 A | | 10/1993 | Blount, Jr. |
| 5,306,567 A | | 4/1994 | Kuo et al. |
| 5,326,820 A | | 7/1994 | Hoffmann et al. |
| 5,344,872 A | | 9/1994 | Debord et al. |
| 5,349,026 A | | 9/1994 | Emmons et al. |
| 5,371,148 A | | 12/1994 | Taylor et al. |
| 5,393,609 A | | 2/1995 | Chang et al. |
| 5,393,840 A | * | 2/1995 | Kuo .................... 525/159 |
| 5,397,641 A | | 3/1995 | Moens et al. |
| 5,416,187 A | | 5/1995 | Kuo et al. |
| 5,439,988 A | | 8/1995 | Moens et al. |
| 5,464,909 A | | 11/1995 | Chang et al. |
| 5,498,668 A | | 3/1996 | Scott |
| 5,541,268 A | | 7/1996 | Fenn et al. |
| 5,554,701 A | | 9/1996 | Chang et al. |
| 5,596,037 A | | 1/1997 | Moens et al. |
| 5,646,237 A | | 7/1997 | George et al. |
| 5,852,120 A | * | 12/1998 | Bederke et al. .......... 525/124 |
| 5,955,565 A | | 9/1999 | Morris et al. |
| 5,993,975 A | | 11/1999 | Tanaka et al. |
| 6,087,464 A | | 7/2000 | Swarup et al. |
| 6,120,851 A | | 9/2000 | Borgholte et al. |
| 6,248,843 B1 | | 6/2001 | Panandiker et al. |
| 6,265,072 B1 | | 7/2001 | Fagerburg |
| 6,423,816 B1 | | 7/2002 | Wamprecht et al. |
| 6,887,937 B1 | | 5/2005 | Vandevoorde et al. |
| 6,992,133 B2 | | 1/2006 | Yokoyama et al. |
| 6,995,194 B2 | | 2/2006 | Moens et al. |
| 7,087,672 B2 | | 8/2006 | Yuan et al. |
| 7,141,625 B2 | | 11/2006 | Komazaki et al. |
| 8,324,316 B2 | | 12/2012 | Powell et al. |
| 8,519,055 B2 | | 8/2013 | Marsh et al. |
| 8,524,834 B2 | | 9/2013 | Marsh et al. |
| 2001/0051706 A1 | | 12/2001 | George et al. |
| 2002/0103329 A1 | | 8/2002 | Koldijk et al. |
| 2004/0024140 A1 | | 2/2004 | Fujita et al. |
| 2004/0087736 A1 | | 5/2004 | Wu et al. |
| 2006/0079650 A1 | | 4/2006 | Stevenson et al. |
| 2006/0286383 A1 | | 12/2006 | Gilmer |
| 2007/0020557 A1 | | 1/2007 | Yao et al. |
| 2007/0092746 A1 | | 4/2007 | Wayton et al. |
| 2007/0232778 A1 | | 10/2007 | Moody et al. |
| 2007/0276065 A1 | | 11/2007 | Barton et al. |
| 2008/0139687 A1 | | 6/2008 | Woods et al. |

FOREIGN PATENT DOCUMENTS

| | | |
|---|---|---|
| GB | 1044015 | 9/1966 |
| GB | 1130558 | 10/1968 |
| JP | 03-038281 | 2/1991 |
| JP | 08-073781 | 3/1996 |
| JP | 09-003341 | 1/1997 |
| JP | 2002-235038 | 8/2002 |
| JP | 2006-233068 | 9/2006 |
| WO | WO 94/01506 | 1/1994 |
| WO | 9412557 | 6/1994 |
| WO | 9501407 | 1/1995 |
| WO | 9633229 | 10/1996 |
| WO | 2006083343 | 8/2006 |
| WO | 2006138198 | 12/2006 |
| WO | WO 2007/001567 | 1/2007 |
| WO | 2007078851 | 7/2007 |

OTHER PUBLICATIONS

International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
Copending U.S. Appl. No. 12/367,113, filed Feb. 6, 2009.
Copending U.S. Appl. No. 12/367,151, filed Feb. 6, 2009.
Copending U.S. Appl. No. 12/367,202, filed Feb. 6, 2009.
Copending U.S. Appl. No. 12/367,133, filed Feb. 6, 2009.
USPTO Office Action dated Aug. 20, 2010 for U.S. Appl. No. 12/367,113.
USPTO Office Action dated Aug. 20, 2010 for U.S. Appl. No. 12/367,202.
USPTO Office Action dated Nov. 30, 2010 for U.S.Appl. No. 12/367,151.
USPTO Office Action dated Dec. 21, 2010 for U.S. Appl. No. 12/367,113.
USPTO Notice of Allowance dated Apr. 10, 2013 for U.S. Appl. No. 13/418,584.
USPTO Notice of Allowance dated Apr. 12, 2013 for U.S. Appl. No. 13/435,347.
Copending U.S. Appl. No. 13/937,259, filed Jul. 9, 2013.
Copending U.S. Appl. No. 13/963,404, filed Jul. 8, 2013.
USPTO Office Action dated Jun. 23, 2011 for U.S. Appl. No. 12/367,202.
USPTO Office Action dated Jun. 24, 2011 for U.S. Appl. No. 12/367,113.
USPTO Office Action dated Nov. 7, 2011 for U.S. Appl. No. 12/367,202.
USPTO Office Action dated Nov. 18, 2011 for U.S. Appl. No. 12/367,113.
USPTO Office Action dated Mar. 7, 2011 for U.S. Appl. No. 12/367,202.
USPTO Office Action dated Mar. 18, 2011 for U.S. Appl. No. 12/367,151.
USPTO Notice of Allowance dated Dec. 19, 2011 for U.S. Appl. No. 12/367,202.
USPTO Notice of Allowance dated Jan. 10, 2012 for U.S. Appl. No. 12/367,113.
Copending U.S. Appl. No. 13/418,584, filed Mar. 13, 2012.
USPTO Office Action dated Mar. 15, 2012 for U.S. Appl. No. 12/367,133.
Copending U.S. Appl. No. 13/435,347, filed Mar. 30, 2012.
USPTO Office Action dated Jun. 15, 2012 for U.S. Appl. No. 13/418,584.
USPTO Office Action dated Jun. 27, 2012 for U.S. Appl. No. 13/435,347.
Heidt, et al., "Florida weathering of Isophthalic Acid-Based, Melamine-Crosslinked Polyester Coatings", Proceedings of the Twenty-Seventh International Waterborne, High-Solids and Powder Coatings Symposium, (2000), pp. 295-307.
Anonymous, "The Use of Cycloaliphatic Diacids and Anhydrides as Monomers for Polyester Polymers to Improve their Compatibility with Acrylic Polymners", Research Disclosure, 360, (1994), pp. 229-230.
Husbands, M.J., et al. "Polyester Resins", A Manual of Resins for Surface Coatings, vol. III, pp. 63-167.
Wicks, Zeno Jr., et al., "Polyester Resins", Organic Coatings Science and Technology, $2^{nd}$ ed.,13, (1999), pp. 246-257.
Oldring, P.K.T., et al., "Vinyl and Acrylic Monomners", A Manual of Resins for Surface Coatings, vol. II, pp. 121-210.
Seo, Kab S., et al., "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Jorissen, D.A., et al., "Higher Solids Polyurethane Coatings", Proceedings of the International Waterborne, High-Solids and Powder Coatings Symposium (1992), $19^{th}$ ed. pp. 182-195.

(56) References Cited

OTHER PUBLICATIONS

Ni, Hai, et al.; "Cycloaliphatic Polyester Based High Solids Polyurethane Coatings: I. The Effect of Difunctional Alcohols"; Journal of Coatings Technology, vol. 74, No. 928, (2002), pp. 49-56.

Vandevoorde, P., et al. Making solid gains Novel acrylic and polyester polyols reduce VOCs in solventborne urethanes, European Coatings Journal (2005) (9) pp. 22-24, 26-29.

Non-Final Office Action dated May 1, 2014 received in U. S. Appl. No. 12/367,151.

"Coating Processes (Powder Technology)"; Kirk-Othmer Encyclopedia of Chemical Technology, $4^{th}$ Edition, vol. 6, p. 641.

Co-pending U. S. Appl. No. 14/305,520, filed Jun. 16, 2014; Marsh et al.

* cited by examiner

ALIPHATIC POLYESTER COATING COMPOSITIONS CONTAINING TETRAMETHYL CYCLOBUTANEDIOL

FIELD OF THE INVENTION

This invention pertains to aliphatic, curable polyesters for solvent-borne, thermosetting coating compositions. More particularly, this invention pertains to curable polyesters containing 2,2,4,4-tetramethyl-1,3-cyclobutanediol and high-solids, solvent-borne thermosetting coating compositions prepared from these polyesters. These polyesters can be used in blends with acrylic resins or serve as the primary film former in a coating formulation.

BACKGROUND OF THE INVENTION

Solvent-borne, polyester thermosetting coatings that exhibit high hardness are desirable. Coatings with high hardness typically exhibit high gloss, good distinctness of image (DOI), fast dry-times, scratch, stain, chemical, and humidity resistance, and outdoor durability.

Aliphatic polyesters are frequently used to reduce viscosity and increase solids for thermosetting acrylic (abbreviated herein as "TSA") coatings. Aliphatic polyesters also are useful as a primary film former in high solids coatings because of their ability to reduce volatile organic compound ("VOC") emissions. Coatings made from aliphatic polyesters are generally flexible but tend to be soft, which results in poor resistance to solvents and chemicals, poor humidity resistance and poor outdoor durability.

Hardness and hardness-related properties of aliphatic polyester resins sometimes can be improved with the addition of 1,4-cyclohexanedimethanol (abbreviated herein as "CHDM") and hydrogenated bisphenol A (abbreviated herein as "HBPA"). Unfortunately, poor solvent solubility and compatibility with acrylic resins often are observed as CHDM content is increased in the polyester resin formulation. The amount of CHDM that can be incorporated into the resin formulation, therefore is limited. HBPA is know to exhibit similar characteristics.

Poor resin solubility often manifests itself over time by phase separation, precipitation of the resin from solution, and the development of hazy to opaque resin solutions. These characteristics are undesirable and limit the storage stability of the resin solution and the coatings formulated from these solutions. Such coatings, for example, may experience a viscosity increase, phase separation, agglomeration of ingredients, etc., that result in an undesirable higher application viscosity, poor appearance and poor mechanical properties of the cured film.

Thermosetting acrylic ("TSA") resins are widely used in industrial coatings. They can be formulated to a high glass transition temperature (Tg) and exhibit excellent light stability and hydrolysis resistance. These properties result in coatings with the desirable characteristics of high hardness; fast dry times; resistance to stains, chemicals and humidity; and good outdoor durability. Consequently, TSA resins often serve as the primary film-former in coatings for demanding applications that include transportation, maintenance, marine and building/construction markets.

Although TSA resins exhibit many desirable properties, they often lack flexibility and require more solvent in the coating formulation to achieve a practical application viscosity. The higher solvent requirement for TSA resins makes it difficult to achieve high solids coatings with reduced VOC content as mandated by various federal and state air quality organizations.

To increase resin and coating solids, reduce viscosity, and lower VOC emission, aliphatic polyester resins can be blended with TSA resins. Unfortunately, the glass transition temperature ("Tg") of the blend frequently decreases significantly as the polyester content increases. The lower Tg of the blend has an adverse impact on the desirable characteristics that the TSA resin imparts to the coating.

There is a need in the coatings industry for aliphatic polyesters that exhibit good hardness with good flexibility and solubility when formulated into thermosetting coatings compositions. In addition, there is a need for aliphatic polyester resins that, when blended with TSA resins, lower the viscosity while maintaining the Tg of the TSA resin in high solids, thermosetting coating compositions.

SUMMARY OF THE INVENTION

The present invention provides curable, aliphatic polyesters prepared from 2,2,4,4-tetramethyl-1,3-cyclobutanediol. Thus, one embodiment of our invention is a curable, aliphatic polyester, comprising:
i. diacid residues, comprising at least 90 mole percent, based on the total moles of diacid residues, of the residues of at least one aliphatic dicarboxylic acid, the aliphatic dicarboxylic acid comprising about 50 to 100 mole percent of a cycloaliphatic dicarboxylic acid;
ii. diol residues, comprising about 50 to 100 mole percent, based on the total moles of diol residues, of the residues of 2,2,4,4-tetramethyl-1,3-cyclobutanediol; and
iii. about 2 about 40 mole percent of the residues of at least one polyol, based on the total moles of diol and polyol residues;
wherein the curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester.

Coatings formulated from these all aliphatic polyester resins can exhibit high gloss, distinctness of image and reflectivity; good hardness with good flexibility; solvent and chemical resistance; and good gloss retention during UV and humidity exposure for good outdoor durability. Thus, another embodiment of our invention is a thermosetting coating composition, comprising:
(A). about 50 to about 90 weight percent, based on the total weight of (A) and (B) of at least one curable, aliphatic polyester, comprising
i. diacid residues, comprising at least 90 mole percent, based on the total moles of diacid residues, of the residues of at least one aliphatic dicarboxylic acid, the aliphatic dicarboxylic acid comprising about 50 to 100 mole percent of a cycloaliphatic dicarboxylic acid;
ii. diol residues, comprising about 50 to 100 mole percent, based on the total moles of diol residues, of the residues of 2,2,4,4-tetramethyl-1,3-cyclobutanediol; and
iii. about 2 about 40 mole percent of the residues of at least one polyol, based on the total moles of diol and polyol residues;
wherein the curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester;

(B). about 10 to about 50 weight percent, based on the total weight of (A) and (B) of a crosslinker comprising at least one compound reactive with a carboxylic acid or a hydroxyl group;

(C). about 10 to about 60 weight percent, based on the total weight of (A), (B), and (C) of at least one nonaqueous solvent.

The aliphatic polyesters may be blended with acrylics or serve as the primary film former to formulate factory and field-applied coatings used in auto OEM, auto refinish, transportation, aerospace, maintenance, marine, machinery and equipment, general metal, appliance, metal furniture, plastic and building/construction applciations. When blended with thermosetting acrylic (TSA) resins, our aliphatic polyesters exhibit good solubility, compatibility and viscosity reduction with good Tg retention of the blend.

DETAILED DESCRIPTION

We have found that curable, aliphatic polyesters that contain 2,2,4,4-tetramethyl-1,3-cyclobutanediol (abbreviated herein as "TMCD") can be used to prepare solvent-borne, high-solids, thermosetting coatings that exhibit high gloss, good hardness and flexibility; and solvent and chemical resistance. These aliphatic polyesters also can be blended with thermosetting acrylic resins ("TSA") to produce blends that have low viscosity, good compatibility, flexibility, and Tg retention. Thus, in a general embodiment, our invention provides a curable, aliphatic polyester, comprising:

i. diacid residues, comprising at least 90 mole percent, based on the total moles of diacid residues, of the residues of at least one aliphatic dicarboxylic acid, the aliphatic dicarboxylic acid comprising about 50 to 100 mole percent of a cycloaliphatic dicarboxylic acid;

ii. diol residues, comprising about 50 to 100 mole percent, based on the total moles of diol residues, of the residues of 2,2,4,4-tetramethyl-1,3-cyclobutanediol; and iii. about 2 about 40 mole percent of the residues of at least one polyol, based on the total moles of diol and polyol residues;

wherein the curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester. Another aspect of the invention is a solvent borne thermosetting coating formulation comprising the above aliphatic polyester resin. The coating formulation may, optionally, comprise a crosslinker, various additives and pigments.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$ and $C_5$ diols as well as $C_2$, $C_3$, and $C_4$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable, aliphatic polyester", as used herein, is synonymous with the term "resin" and is intended to mean a thermosetting surface coating polymer prepared by the polycondensation of one or more acid components, diol components, and polyol components. The curable, aliphatic polyester of the present invention is a thermoset polymer and is suitable as a resin for solvent-based coatings. This polyester has a low molecular weight, typically about 300 to about 10,000 daltons, and would not be suitable for the fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid or 1,3-cyclohexanedicarboxylic acid, or a mixture of one or more aliphatic and cycloaliphatic acids. The diol component may comprise one or more cycloaliphatic diols such as, for example, 2,2,4,4-tetramethyl-1,3-cyclobutanediol, either alone or in combination with one or more linear or branched aliphatic diols such as, for example, neopentyl glycol. Catalysts may be used to accelerate the rate of the polycondensation reaction. Additional examples of each of the components of the curable, aliphatic polyester include those known in the art including, but not limited to, those discussed below, and in various documents known in the art such as, for example, in *Resins for Surface Coatings*, Vol. III, p. 63-167, ed. by P. K. T. Oldring and G. Hayward, *SITA Technology*, London, UK, 1987.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "cycloaliphatic", as used herein, is intended to mean an aliphatic, cyclic compound. The term "aliphatic polyester", as used herein, is understood to mean a polyester that contains 90 or greater mole percent aliphatic diacid or diol residues, based on the total moles of diacid or diol residues. Small amounts (i.e., 10 mole percent or less) of aromatic dicarboxylic acids or aromatic diols also may be present.

The curable, aliphatic polyester comprises diacid residues, that comprise at least 90 mole percent, based on the total moles of diacid residues, of the residues of at least one aliphatic dicarboxylic acid which, in turn, comprises about 50 to 100 mole percent of a cycloaliphatic dicarboxylic acid. Some examples of aliphatic and cycloaliphatic dicarboxylic acids include, but are not limited to, adipic acid, dodecanedioic acid, sebacic acid, azelaic acid, 1,4-cyclohexanedicarboxylic acid, 1,3-cyclohexanedicarboxylic acid, hexahydrophthalic anhydride, tetrahydrophthalic anhydride succinic acid, glutaric acid, and combinations thereof. For example, the curable, aliphatic polyester can comprise about 50 mole percent of the residues of 1,4-cyclohexanedicarboxylic acid and about 50 mole percent of the residues of adipic acid, based on the total moles of diacid residues. In another example, the curable, aliphatic polyester can contain about 50 mole percent of the residues of hexahydrophthalic anhydride and about 50 mole percent of the residues of adipic acid.

Some additional, non-limiting examples of the diacid component of the curable, aliphatic polyester are as follows: (a) about 50 to about 85 mole percent of the residues of at least one diacid chosen from 1,4-cyclohexanedicarboxylic acid, 1,3-cyclohexanedicarboxylic acid, hexahydrophthalic anhydride, and combinations thereof; and about 15 to about 50 mole percent of the residues of at least one alicyclic aliphatic diacid having from 4 to 10 carbon atoms; (b) about 50 to about 85 mole percent of the residues of at least one diacid chosen from 1,4-cyclohexanedicarboxylic acid, hexahydrophthalic anhydride, and combinations thereof; and about 15 to about 50 mole percent of the residues of at least one diacid chosen from adipic acid, succinic acid, and glutaric acid; (c) about 50 to about 75 mole percent of the residues of at least one diacid chosen from 1,4-cyclohexanedicarboxylic acid, hexahydrophthalic anhydride, and combinations thereof; and about 25 to about 50 mole percent of the residues of at least one diacid chosen from adipic acid, succinic acid, and glutaric acid; (d) about 50 to about 65 mole percent of the residues of at least one diacid chosen from 1,4-cyclohexanedicarboxylic acid, hexahydrophthalic anhydride, and combinations thereof; and about 35 to about 50 mole percent of the residues of at least one diacid chosen from adipic acid, succinic acid, and glutaric acid; (e) about 50 mole percent of the residues of one or diacids chosen from 1,4-cyclohexanedicarboxylic acid, hexahydrophthalic anhydride, and combinations thereof; and about 50 mole percent of the residues of adipic acid; and (f) about 50 mole percent of the residues of 1,4-cyclohexanedicarboxylic acid and about 50 mole percent of the residues of adipic acid. In addition to the residues of alicyclic and cyclic aliphatic dicarboxylic acids described above, the diacid residues may further comprise from 0 to about 10 mole percent of the residues of at least one aromatic dicarboxylic acid chosen from phthalic acid, terephthalic acid, isophthalic acid, 2,6-naphthalenedicarboxylic acid, and combinations thereof.

In addition to the aliphatic diacid residues described above, the acid component of our inventive polyester composition may further comprise the residues of a monocarboxylic acid or a polybasic acid containing more that 2 carboxylic acid groups. For example, the curable, aliphatic polyester may comprise residues of at least one monocarboxylic acid or a polybasic acid chosen from benzoic acid, acetic acid, 2-ethylhexanoic acid, propionic acid, tert-butyl benzoic acid, and butanoic acid; trimellitic anhydride; or a mixture thereof. In another example, the acid component can comprise the residues of at least one aliphatic tricarboxylic acid such as, for example, 1,2,4-cyclohexanetricarboxylic acid, 1,3,4-butanetricarboxylic acid, 1,2,5-hexanetricarboxylic acid, and mixtures of one or more of these acids.

The curable, aliphatic polyester also comprises the residues of 2,2,4,4-tetramethyl-1,3-cyclobutanediol ("TMCD"). For example, the curable, aliphatic polyester can comprise about 50 to 100 mole percent TMCD, based on the total moles of diol residues. Other representative examples of TMCD concentrations, are about 75 to 100 mole percent, and about 85 to 100 mole percent.

Other aliphatic diols, in addition to TMCD, can be used to prepare the curable, aliphatic polyester of the instant invention. Representative examples of aliphatic diols include, but are not limited to, neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,2-butanediol, 1,3-butanediol, 1,4-butanediol, 1,5-pentanediol, 1,6-hexanediol, 2-ethyl-1,3-hexanediol, 2,2,4,4-tetramethyl-1,6-hexanediol, thiodiethanol, 1,2-cyclohexanedimethanol, 1,3-cyclohexanedimethanol, 1,4- cyclohexanedimethanol, 2,2,4-trimethyl 1,3-pentanediol, 2,4-diethyl-1,5-pentanediol, hydroxypivalyl hydroxypivalate, 1,10-decanediol and hydrogenated bisphenol A. For example, in one embodiment, the curable, aliphatic polyester resins comprise a combination of the residues of neopentyl glycol and TMCD. It should be understood that the diols listed above may be used in any combination with TMCD and the aforementioned diacid components and in any amount within the ranges described hereinabove For example, in one embodiment, the curable, aliphatic polyester can comprise (i) diacid residues comprising about 50 to about 85 mole percent of the residues of at least one cycloaliphatic dicarboxylic acid chosen from 1,4-cyclohexanedicarboxylic acid, 1,3-cyclohexanedicarboxylic acid, hexahydrophthalic anhydride, and about 15 to about 50 mole percent of the residues at least one acylic aliphatic dicarboxylic acid chosen from dodecanedioic acid, adipic acid, sebacic acid, azelaic acid, maleic acid, fumaric acid, succinic acid, and glutaric acid; and (ii) diol residues comprising about 50 to 100 mole percent of the residues of TMCD and about 50 to 0 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A. In another example, the curable aliphatic polyester can comprise (i) diacid residues comprising about 50 to about 85 mole percent of the residues of 1,4-cyclohexanedicarboxylic acid, hexahydrophthalic anhydride, or a mixture thereof, and about 15 to about 50 mole percent of the residues of adipic acid; and (ii) diol residues comprising about 50 to 100 mole percent of the residues of TMCD and about 50 to 0 mole percent of the residues of neopentyl glycol. In yet another example, the curable, aliphatic polyester can comprise (i) diacid resides comprising about 50 mole percent of the residues of hexahydrophthalic anhydride and about 50 mole percent of the residues of adipic acid; and (ii) diol residues comprising about 75 to 100 mole percent of the residues of 2,2,4,4-tetramethyl-1,3-cyclobutanediol, and about 25 to 0 mole percent of the residues of neopentyl glycol.

In addition to diacid and diol residues, the curable, aliphatic polyester comprises about 2 to about 40 mole percent of the residues of at least one polyol, based on the total moles of diol and polyol residues. These polyols may include aliphatic, alicyclic, and cyclic alkyl polyols. Some specific examples of polyols include, but are not limited to, trimethylolpropane (abbreviated herein as "TMP), pentaerythritol (abbreviated herein as "PE"), trimethylolethane (abbreviated herein as "TME"), erythritol, threitol, dipentaerythritol, sorbitol, glycerine, and the like. In one example, the curable, aliphatic polyester can comprise about 3 to about 30 mole percent of the residues of at least one polyol selected from trimethylolpropane, pentaerythritol, trimethylolethane, erythritol, threitol, dipentaerythritol, sorbitol, and glycerine. In another embodiment, the curable, aliphatic polyester comprises trimethylolpropane.

The curable, aliphatic polyester of this invention has a hydroxyl number of about 20 to about 450 mg KOH/g resin. Further examples of hydroxyl number are about 25 to about 300, and about 30 to about 250. In addition, the curable, aliphatic polyester has an acid number of about 0 to about 80 mg KOH/g polyester or, in other examples, about 2 to about 25 mg KOH/g polyester, and about 2 to about 15 mg KOH/g polyester. The number average molecular weight of the curable, aliphatic polyester is about 300 daltons to about 10,000 daltons. Additional examples of molecular weight ranges are about 400 to about 7000, and about 500 to about 5000. The curable, aliphatic polyester has a glass transition temperature (abbreviated herein as "Tg") of about −35 to about 35° C. Some additional, representative examples of Tg ranges for the curable, aliphatic polyester are about −35 to about 30° C., about −35 to about 25° C., about −35 to less than 20, about −35 to about 19° C., about −35 to about 18° C., about −35 to about 17° C., about −35 to about 16° C., about −35 to about 15° C., about −35 to about 10° C. For example, the curable, aliphatic polyester can have a hydroxyl number of about 30 to about 250 mg potassium hydroxide per gram of polyester, an acid number of about 2 to about 15 mg potassium hydroxide per gram of polyester, and a number average molecular weight of about 700 to about 7000 daltons, and a Tg of about −20 to about 20° C.

A further aspect of the invention is a curable, aliphatic polyester, consisting essentially of:
i. diacid residues, consisting essentially of the residues of at least one aliphatic dicarboxylic acid, the aliphatic dicarboxylic acid comprising about 50 to 100 mole percent, based on the total moles of diacid residues, of a cycloaliphatic dicarboxylic acid selected from residues of 1,4-cyclohexanedicarboxylic acid, hexahydrophthalic anhydride, or a mixture thereof;
ii. diol residues, consisting essentially of about 75 to 100 mole percent, based on the total moles of diol residues, of the residues of 2,2,4,4-tetramethyl-1,3-cyclobutanediol;
iii. about 2 about 40 mole percent of the residues of at least one polyol, based on the total moles of diol and polyol residues;
wherein the curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester.

The phrase "consisting essentially of", as used herein is intended to encompass curable polyesters having components (i)-(iii) listed above and is understood to exclude any elements that would substantially alter the essential properties of the polyester to which the phrase refers. For example, the diacid and diol residues may include other components that do not alter the solubility of the curable, aliphatic polyester and its compatibility with TSA resins. For example, any combination of diol, diacid, and polyol monomers that would produce a resin having a Tg greater than about 45° C. would be understood in the art to reduce that solubility of a polyester polymer would be excluded from this embodiment. Some representative classes of diacids and diols that would be expected to increase Tg and reduce solubility include, but are not limited to, cycloaliphatic diol or diacid components, and polycycloaliphatic diacids or diols. Some examples of diacid and diol components that would be excluded from this embodiment are hydrogenated bisphenol A at 50 mole percent or greater and tetrahydrophthalic acid or anhydride at 25 mole percent or greater. All mole percentages are based upon the total moles of diacid or diol residues.

By contrast, some examples of compositions that would be included in the above embodiment are those, for example, in which the aliphatic polyester consists essentially of (i) diacid residues consisting essentially of about 50 to about 85 mole percent of the residues of at least one cycloaliphatic dicarboxylic acid chosen from 1,4-cyclohexanedicarboxylic acid, hexahydrophthalic anhydride, and about 50 to about 15 mole percent of the residues at least one acyclic aliphatic dicarboxylic acid chosen from adipic acid, dodecanedioic acid, sebacic acid, azelaic acid, maleic acid, fumaric acid, succinic acid, and glutaric acid; and (ii) diol residues consisting essentially of about 75 to 100 mole percent of the residues of 2,2,4,4-tetramethyl-1,3-cyclobutanediol and about 25 to 0 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, hydroxypivalyl hydroxypivalate, 1,10-decanediol, and hydrogenated bisphenol A. In another example, the curable aliphatic polyester consists essentially of (i) diacid residues consisting essentially of about 50 to about 85 mole percent of the residues of 1,4-cyclohexanedicarboxylic acid, hexahydrophthalic anhydride, or a mixture thereof, and about 15 to about 50 mole percent of the residues of adipic acid; and (ii) diol residues consisting essentially of about 75 to 100 mole percent of the residues of TMCD and about 25 to 0 mole percent of the residues of neopentyl glycol. In yet another example, the curable, aliphatic polyester can consist essentially of (i) diacid resides consisting essentially of about 50 mole percent of the residues of hexahydrophthalic anhydride and about 50 mole percent of the residues of adipic acid; and (ii) diol residues consisting essentially of about 75 to 100 mole percent of the residues of 2,2,4,4-tetramethyl-1,3-cyclobutanediol, and about 25 to 0 mole percent of the residues of neopentyl glycol.

The curable, aliphatic polyester has a glass transition temperature (abbreviated herein as "Tg") of about −35 to about 35° C. Some additional, representative examples of Tg ranges for the curable, aliphatic polyester are about −35 to about 30° C., about −35 to about 25° C., about −35 to less than 20, about −35 to about 19° C., about −35 to about 18° C., about −35 to about 17° C., about −35 to about 16° C., about −35 to about 15° C., about −35 to about 10° C.

The curable, aliphatic polyester can be prepared by heating the reactants until the desired molecular weight, acid number, or hydroxyl number is reached. The reaction can be monitored by the collection of water (when diacids are used as starting materials) or alcohol (when diesters are used). The polyester typically can be prepared at a temperature range of about 150 to about 250° C. and at atmospheric pressure or under vacuum. In one embodiment, for example, the diacid and diol components of the polyester may be partially reacted before the polyol is added. Once the polyol is added to the reaction mixture, heating is continued until a target acid number is satisfied.

Alternatively, the curable, aliphatic polyester can be prepared in the presence of a process solvent to help remove the water or alcohol by-products of the reaction and to promote the synthesis of the polyester resin. The process solvent may be any solvent known in the art as useful for the preparation of polyester polymers. For example, the process solvent can be a hydrocarbon solvent. In another example, the process solvent can comprise an aromatic hydrocarbon such as, for example, xylene. The xylene can be a pure isomer, or a mixture of ortho, meta, and para isomers. The amount of process solvent may be determined by routine experimentation as understood by those skilled in the art. The process solvent can be added in amounts ranging from 0.5 to about 5 weight percent, based on the total weight of reaction mixture.

Optionally, a catalyst may be used to promote the synthesis of the polyester. The catalyst may be any catalyst known in the art to be useful for the formation of polyester resins. For example, the catalyst can be a tin catalyst, such as, for example, FASCAT™ 4100 (available from Arkema Corporation). The catalyst increases the rate of the polyester resin reaction, as described above, and its amount may be determined by routine experimentation as understood by those skilled in the art. Ordinarily, the catalyst is added in amounts ranging from about 0.01 to about 1.00 weight percent based on the total weight of the reactants.

Our invention also provides a coating composition comprising the various embodiments of the curable, aliphatic polyester resin containing 2,2,4,4-tetramethyl-1,3-cyclobutanediol (TMCD) as described above. Thus, another aspect of the present invention is a thermosetting coating composition, comprising:

(A). about 50 to about 90 weight percent, based on the total weight of (A) and (B) of at least one curable, aliphatic polyester, comprising
 i. diacid residues, comprising at least 90 mole percent, based on the total moles of diacid residues, of the residues of at least one aliphatic dicarboxylic acid, the aliphatic dicarboxylic acid comprising about 50 to 100 mole percent of a cycloaliphatic dicarboxylic acid;
 ii. diol residues, comprising about 50 to 100 mole percent, based on the total moles of diol residues, of the residues of 2,2,4,4-tetramethyl-1,3-cyclobutanediol; and
 iii. about 2 about 40 mole percent of the residues of at least one polyol, based on the total moles of diol and polyol residues;
  wherein the curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester;
(B). about 10 to about 50 weight percent, based on the total weight of (A) and (B) of a crosslinker comprising at least one compound reactive with a carboxylic acid or a hydroxyl group;
(C). about 10 to about 60 weight percent, based on the total weight of (A), (B), and (C) of at least one nonaqueous solvent.

It is understood that the curable, aliphatic polyester component of coating composition may include any combination of the various embodiments of diacids, diols, polyols, acid and hydroxyl numbers, and glass transition temperatures described hereinabove in accordance with the present invention. For example, the curable, aliphatic polyester can comprise about 50 mole percent of the residues of 1,4-cyclohexanedicarboxylic acid and about 50 mole percent of the residues of adipic acid, based on the total moles of diacid residues. In another example, the curable, aliphatic polyester can contain about 50 mole percent of the residues of hexahydrophthalic anhydride and about 50 mole percent of the residues of adipic acid. Some additional, non-limiting examples of the diacid component of curable, aliphatic polyester are as follows: (a) about 50 to about 85 mole percent of the residues of at least one diacid chosen from 1,4-cyclohexanedicarboxylic acid, 1,3-cyclohexanedicarboxylic acid, hexahydrophthalic anhydride, and combinations thereof; and about 15 to about 50 mole percent of the residues of at least one alicyclic aliphatic diacid having from 4 to 10 carbon atoms; (b) about 50 to about 85 mole percent of the residues of at least one diacid chosen from 1,4-cyclohexanedicarboxylic acid, hexahydrophthalic anhydride, and combinations thereof; and about 15 to about 50 mole percent of the residues of at least one diacid chosen from adipic acid, succinic acid, and glutaric acid; (c) about 50 to about 75 mole percent of the residues of one or diacids chosen from 1,4-cyclohexanedicarboxylic acid, hexahydrophthalic anhydride, and combinations thereof; and about 25 to about 50 mole percent of the residues of at least one diacid chosen from adipic acid, succinic acid, and glutaric acid; (d) about 50 to about 65 mole percent of the residues of one or diacids chosen from 1,4-cyclohexanedicarboxylic acid, hexahydrophthalic anhydride, and combinations thereof; and about 35 to about 50 mole percent of the residues of at least one diacid chosen from adipic acid, succinic acid, and glutaric acid; (e) about 50 mole percent of the residues of one or diacids chosen from 1,4-cyclohexanedicarboxylic acid, hexahydrophthalic anhydride, and combinations thereof; and about 50 mole percent of the residues of adipic acid; and (f) about 50 mole percent of the residues of 1,4-cyclohexanedicarboxylic acid and about 50 mole percent of the residues of adipic acid. In addition to the residues of alicyclic and cyclic aliphatic dicarboxylic acids described above, the diacid residues may further comprise from 0 to about 10 mole percent of the residues of at least one aromatic dicarboxylic acid chosen from phthalic acid, terephthalic acid, isophthalic acid, 2,6-naphthalenedicarboxylic acid, and combinations thereof.

As described previously, the acid component of our inventive polyester composition may further comprise the residues of a monocarboxylic acid or a polybasic acid containing more that 2 carboxylic acid groups, such as, for example, the residues of at least one monobasic or polybasic carboxylic acid chosen from benzoic acid, acetic acid, 2-ethylhexanoic acid, propionic acid, tert-butyl benzoic acid, butanoic acid; trimellitic acid; 1,2,4-cyclohexanetricarboxylic acid, 1,3,4-butanetricarboxylic acid, and 1,2,5-hexanetricarboxylic acid.

In addition to TMCD, the curable, aliphatic polyester of the coating composition can comprise from 0 to about 50 mole percent of at least one aliphatic diol. Representative examples of aliphatic diols include, but are not limited to, neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,2-butanediol, 1,3-butanediol, 1,4-butanediol, 1,5-pentanediol, 1,6-hexanediol, 2-ethyl-1,3-hexanediol, 2,2,4,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, 2,4-diethyl-1,5-pentanediol, hydroxypivalyl hydroxypivalate, 1,10-decanediol and hydrogenated bisphenol A. For example, in one embodiment, the curable, aliphatic polyester resins comprise a combination of the residues or neopentyl glycol and TMCD. It should be understood that the diols listed above may be used in any combination with TMCD and the diacid components and in any amount within the ranges described hereinabove.

For example, in one embodiment, the curable, aliphatic polyester can comprise (i) diacid residues comprising about 50 to about 85 mole percent of the residues of at least one cycloaliphatic dicarboxylic acid chosen from 1,4-cyclohexanedicarboxylic acid, 1,3-cyclohexanedicarboxylic acid, hexahydrophthalic anhydride, and about 15 to about 50 mole percent of the residues at least one acylic aliphatic dicarboxylic acid chosen from adipic acid, dodecanedioic acid, sebacic acid, azelaic acid, maleic acid, fumaric acid, succinic acid, and glutaric acid; and (ii) diol residues comprising about 50 to 100 mole percent of the residues of TMCD and about 50 to 0 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A. In another example, the curable aliphatic polyester can comprise (i) diacid residues comprising about 50 to about 85 mole percent of the residues of 1,4-cyclohexanedicarboxylic acid, hexahydrophthalic anhydride, or a mixture thereof, and about 15 to about 50 mole percent of the residues of adipic acid; and (ii) diol residues comprising about 50 to 100 mole percent of the residues of TMCD and about 50 to 0 mole percent of the residues of neopentyl glycol. In yet another example, the curable, aliphatic polyester can comprise (i) diacid resides comprising about 50 mole percent of the residues of hexahydrophthalic anhydride and about 50 mole percent of the residues of adipic acid; and (ii) diol residues comprising about 75 to 100 mole percent of the residues of 2,2,4,4-tetramethyl-1,3-cyclobutanediol, and about 25 to 0 mole percent of the residues of neopentyl glycol.

In addition to diacid and diol residues, the curable, aliphatic polyester of the coating composition comprises about 2 to about 40 mole percent of the residues of at least one polyol, based on the total moles of diol and polyol residues. These polyols may include aliphatic, alicyclic, and cyclic alkyl polyols. Some specific examples of polyols include, but are not limited to, trimethylolpropane (abbreviated herein as "TMP), pentaerythritol (abbreviated herein as "PE"), trimethylolethane (abbreviated herein as "TME"), erythritol, threitol, dipentaerythritol, sorbitol, glycerine, and the like. In one example, the curable, aliphatic polyester can comprise about 3 to about 30 mole percent of the residues of at least one polyol selected from trimethylolpropane, pentaerythritol, trimethylolethane, erythritol, threitol, dipentaerythritol, sorbitol, and glycerine. In another embodiment, the curable, aliphatic polyester comprises trimethylolpropane.

The curable, aliphatic polyester of this invention has a hydroxyl number of about 20 to about 450 mg KOH/g resin. Further examples of hydroxyl number are about 25 to about 300, and about 30 to about 250. In addition, the curable, aliphatic polyester has an acid number of about 0 to about 80 mg KOH/g polyester or, in other examples, about 2 to about 25 mg KOH/g polyester, and about 2 to about 15 mg KOH/g polyester. The number average molecular weight of the curable, aliphatic polyester is about 300 daltons to 10000 daltons. Additional examples of molecular weight ranges are about 400 to about 7000, and about 500 to about 5000. The curable, aliphatic polyester has a glass transition temperature (abbreviated herein as "Tg") of about −35 to about 35° C.

Some additional, representative examples of Tg ranges for the curable, aliphatic polyester are about −35 to about 30° C., about −35 to about 25° C., about −35 to less than 20, about −35 to about 19° C., about −35 to about 18° C., about −35 to about 17° C., about −35 to about 16° C., about −35 to about 15° C., about −35 to about 10° C. For example, the curable, aliphatic polyester can have a hydroxyl number of about 30 to about 250 mg potassium hydroxide per gram of polyester, an acid number of about 2 to about 15 mg potassium hydroxide per gram of polyester, and a number average molecular weight of about 700 to about 7000 daltons, and a Tg of about −20 to about 20° C.

The curable, aliphatic polyester resin comprises a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. The concept is known to those skilled in the art and described in *Organic Coatings Science and Technology*, 2nd ed., p. 246-257, by Z. Wicks, F. Jones, and S. Pappas, Wiley, New York, 1999.

The thermosetting coating composition may further contain about 10 to about 50 weight percent of at least one crosslinker, based on the combined weight of the polyester and the crosslinker. Typically, the crosslinker will be a compound, generally known in the art, that can react with either the carboxylic acid-terminated or hydroxyl-terminated polyester resin. For example, the crosslinker can comprise at least one compound chosen from epoxides, melamines, hydroxy alkyl amides, and isocyanates. For example, epoxide crosslinkers will react with a carboxylic acid-terminated polyester resin, whereas melamines, isocyanates, and isocyanurates will react with a hydroxyl-terminated polyesters.

Melamine or "amino" crosslinkers also are well-known in the art and can be used in the coating composition of the invention. For example, the coating composition of the present invention can comprise at least one melamine compound chosen from hexamethoxymethylmelamine, tetramethoxymethylbenzoguanamine, tetramethoxy-methylurea, and mixed butoxy/methoxy substituted melamines. Some examples of commercially available melamine crosslinkers include the CYMEL™300 series and CYMEL™ 1100 series melamine crosslinkers, available from Cytec Surface Specialties. The polyester to melamine weight ratio is typically about 50:50 to about 90:10. Other examples of polyester:melamine weight ratios are about 60:40 to about 85:15 and about 65:35 to about 80:20.

In addition to melamines, isocyanates and isocyanurates can be used as crosslinkers in accordance with the invention. Representative isocyanates and isocyanurates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis(4-cyclohexyl isocyanate), isophorone diisocyanate and isocyanate-terminated adducts of ethylene glycol, 1,4-butylene glycol, trimethylol propane, or combinations thereof.

The coating composition also can comprise isocyanate-terminated adducts of diols and polyols, such as ethylene glycol, 1,4-butylene glycol, trimethylol propane, etc., as crosslinkers. These crosslinkers are formed by reacting more than one equivalent of a diisocyanate, such as those mentioned above, with one equivalent of a diol or polyol to form a higher molecular weight isocyanate prepolymer with a isocyanate functionality of 2 to 3. Some commercial examples of isocyanate-terminated adducts include isocyanate crosslinkers under the DESMODUR™ and MONDUR™ trademarks available from Bayer Material Science and under the TOLONATE™ trademark from Perstorp Corporation.

In one embodiment of the invention, the crosslinker comprises at least one aliphatic isocyanate, which can provide good outdoor durability and color stability in the cured coating. Examples of aliphatic isocyanates include 1,6-hexamethylene diisocyanate, 1,4-butylene diisocyanate, methylene bis (4-cyclohexyl isocyanate), isophorone diisocyanate, and combinations thereof. Mixtures of isocyanate crosslinkers can also be employed. In yet another embodiment, the crosslinker can comprise isocyanurates of 1,6-hexamethylene diisocyanate, the biuret of 1,6-hexamethylene diisocyanate, or a mixture thereof.

Stoichiometric calculations for the curable, aliphatic polyester and isocyanate reaction are known to those skilled in the art and are described in *The Chemistry of Polyurethane Coatings*, Technical Publication, p. 20, by Bayer Material Science, 2005. Persons having ordinary skill in the art will understand that crosslinking between the polyester resin and isocyanate reaches maximum molecular weight and optimal properties associated with molecular weight at an isocyanate:hydroxyl equivalent ratio of about 1:1; that is, when one equivalent of isocyanate (—NCO) reacts with one equivalent of hydroxyl (—OH). Typically, however, a small excess of isocyanate, for example, about 5 to about 10% above a 1:1 equivalent, is used to allow for the loss of isocyanate by the reaction with adventitious moisture from the atmosphere, solvents, and pigments. Other NCO:OH ratios can be used; for example, it may be desirable to vary the NCO to OH ratio to less than 1:1 to improve flexibility or greater than 1:1 to produce harder, more chemical resistant, and more weather resistant coatings.

For the present invention, the solvent borne, thermosetting coating composition has an NCO:OH ratio, on an equivalent basis, of about 0.9:1.0 to about 1.5:1.0. Examples of other NCO:OH ratios are about 0.95:1.0 to about 1.25:1.0 and about 0.95:1.0 to about 1.1:1.0.

The thermosetting coating composition also comprises about 10 to about 60 weight percent, based on the total weight of components (A), (B), and (C) of a solvent. Examples of solvents include, but are not limited to, benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), or combinations thereof. The coating composition may also comprise reactive solvents such as, for example, diallyl phthalate, SANTOLINK™ XI-100 polyglycidyl allyl ether (available from Cytec), and others as described, for example, in U.S. Pat. No's. 5,349,026 and 5,371,148.

The coating composition, optionally, can further comprise at least one crosslinking catalyst. Representative crosslinking catalysts include carboxylic acids, sulfonic acids, tertiary amines, tertiary phosphines, tin compounds, or combinations of these compounds. Some specific examples of crosslinking catalysts are at least one compound chosen from p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate. The selection of a crosslinking catalyst typically depends on the type of crosslinker that is used in the coating composition. For example, the crosslinker can comprise a melamine or "amino" crosslinker and the crosslinking catalyst can comprise p-toluenesulfonic acid, unblocked and blocked dodecylbenzene sulfonic (abbreviated herein as "DDBSA"), dinonyl-naphthalene sulfonic acid (abbreviated herein as "DNNSA") and dinonylnaphthalene disulfonic acid (abbreviated herein as "DNNDSA"). Some of these catalysts are available commercially under the trademarks such as, for example, NACURE™ 155, 5076, 1051, and 5225 (available from King Industries), BYK-CATALYSTS™ (available from BYK-Chemie USA), and CYCAT™ catalysts (available from Cytec Surface Specialties).

In another embodiment, the curable, aliphatic polyester can comprise hydroxyl-terminated end groups and the crosslinker can comprise an isocyanate. The coating composition also can comprise at least one isocyanate crosslinking catalyst such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212™ non-tin catalysts (available from King Industries), and tertiary amines.

In another example, the thermosetting coating composition can comprise about 25 to about 35 weight percent solvent, about 20 to about 35 weight percent of a melamine crosslinker, and a crosslinking catalyst comprising p-toluenesulfonic acid. In another example, the thermosetting coating composition comprises about 25 to about 35 weight percent solvent and about 20 to about 35 weight percent hexamethoxy—methylmelamine.

The coating composition of the instant invention may further contain at least one coating additive known in the art. Examples of coating additives include, but are not limited to, leveling, rheology and flow control agents such as silicones, fluorocarbons or cellulosics; extenders; plasticizers; flatting agents; pigment wetting and dispersing agents; ultraviolet (UV) absorbers; UV light stabilizers; defoaming and anti-foaming agents; anti-settling, anti-sag and bodying agents; anti-skinning agents; anti-flooding and anti-floating agents; and corrosion inhibitors. Specific examples of such additives can be found in the Raw Material Index and Buyer's Guide, published by the National Paint & Coatings Association, 1500 Rhode Island Avenue, N.W., Washington., DC 20005. Further examples of such additives may be found in U.S. Pat. No. 5,371,148.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™. Examples of dispersing agents include, but are not limited to, sodium bis(tridecyl)sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corp./Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Examples of UV absorbers, UV light stabilizers, and anti-oxidants include, but are not limited to, substituted benzophenone, substituted benzotriazoles, hindered amines, hindered benzoates, phenols, and phosphites, some of which are available from Cytec Specialty Chemicals as CYASORB® UV, and from Ciba Specialty Chemicals as TINUVIN®, CHIMASSORB®, IRGANOX® and IRGAFOS®; diethyl-3-acetyl-4-hydroxy-benzyl-phosphonate, 4-dodecyloxy-2-hydroxy benzophenone, and resorcinol monobenzoate. For example, in one embodiment, the thermosetting coating compositon can contain IRGANOX® 1010 antioxidant, available from Ciba Specialty Chemicals.

Such paint or coating additives as described above form a relatively minor proportion of the coating composition, generally about 0.05 weight percent to about 5.00 weight percent. For example, a coating composition optionally may contain at least one of the above-described additives and at least one pigment.

The solvent borne thermosetting coating composition, as described above, also may comprise at least one pigment. Typically, the pigment is present in an amount of about 20 to about 60 weight percent, based on the total weight of the composition. Examples of pigments include those generally recognized by persons of ordinary skill in the art of surface coatings. For example, the pigment may be a typical organic or inorganic pigment, especially those set forth by the Colour Index, 3rd ed., 2nd Rev., 1982, published by the Society of Dyers and Colourists in association with the American Association of Textile Chemists and Colorists. Other examples of suitable pigments include, but are not limited to, titanium dioxide, barytes, clay, calcium carbonate, Cl Pigment White 6 (titanium dioxide), Cl Pigment Red 101 (red iron oxide), Cl Pigment Yellow 42, Cl Pigment Blue 15,15:1,15:2,15:3,15:4 (copper phthalocyanines); Cl Pigment Red 49:1 and Cl Pigment Red 57:1. Colorants such as, for example, phthalocyanine blue, molybdate orange, or carbon black also may be added to the coating composition. For example, the solvent borne, thermosetting coating formulations can contain titanium dioxide as the pigment.

The thermosetting coating composition of this invention may optionally comprise a TSA resin. Thermosetting acrylic ("TSA") resins are prepared by free radical polymerization in bulk or in a solvent. Initiators are of the free radical type and are usually organic peroxides or azo compounds, such as benzoyl peroxide, t-butyl hydroperoxide, t-butyl peroxide, t-butyl peroxybenzoate, azobisisobutyronitrile, and 2,2'-azo-bis(2,4-dimethyl)-valeronitrile. The reaction is preferably carried out at the reflux temperature of the solvent used, which is generally higher than the thermal decomposition temperature of the initiator employed. The acrylic resin is composed of ethylenically unsaturated monomers that include acrylate, methacrylate, styrene, (meth) acrylic acid, and vinyl esters. They further contain hydroxyl, epoxy, carboxyl, blocked-phenol and/or acetoacetoxy functional groups. Suitable examples of preparation methods and components of the acrylic resin include those known in the art including, but not limited to, those described above, and in *Resins for Surface Coatings*, Vol. II, p. 121-210, ed. by P. K. T. Oldring and G. Hayward, SITA Technology, London, UK, 1987.

Examples of hydroxyl functional TSA resins include the MACRYNAL™ series, available from Cytec Surface Specialties; the ACRYLOID™ series, available from Rohm and Haas; and the JONCRYL™ series, available from BASF Corporation. One specific example of a hydroxyl functional TSA resin used is MACRYNAL™ SM 515/70BAC, available from Cytec Surface Specialties.

The curable, aliphatic polyester and the TSA resin can be blended together. The weight percent of polyester in the blend is about 5 to about 50 wt. percent preferably about 10 to about 40 weight percent, and most preferably about 15 to about 30 weight percent.

Typically, the thermosetting coating composition and additives can be formulated into coating that contains about 40 to about 90% non-volatiles. After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., about 0.5 to about 4 mils of wet coating onto a substrate. The coating can be cured at ambient (room) temperature or heated in a forced air oven to a temperature of about 50° C. to about 175° C., for a time period that typically ranges about 5 to about 90 minutes and allowed to cool. Further examples of typical application and curing methods can be found in U.S. Pat. No.'s. 4,737,551 and 4,698,391 and 3,345,313. The invention is further illustrated by the following examples.

EXAMPLES

Preparation of Curable, Aliphatic Polyesters—Comparative Example P1, Example P2, Example P3 and Example P4—The example and comparative aliphatic polyester resins (Table 1) were prepared according to the following procedure, targeting a number average molecular weight=1250, a hydroxyl equivalent weight=500, a hydroxyl functionality=2.5 and final acid number=8.

The resins were prepared using a solvent process to help remove the water of esterification. The resins were prepared in a two-liter reaction kettle equipped with a heating mantle, mechanical stirrer, thermocouple, nitrogen blanket (0.6 scfh), oil-heated partial condenser (103° C.-105° C.), condensate trap, and water-cooled total condenser (15° C.). The condensate trap, kettle top and adapter from the kettle to the column were insulated by aluminum foil and fiberglass tape to facilitate water removal. Stage 1 raw materials were charged to the reactor. Additional xylene (approximately 30 g) was used to fill the condensate trap. The temperature was then increased from room temperature to 150° C. over ninety minutes to form a homogenous melt. Agitation (300 rpm) was started and the temperature increased to a maximum of 230° C. over 240 minutes. The Stage 2 TMP was added when half the theoretical condensate was collected. The reaction mixture was held at 230° C. until a final acid number of 6±2 mg KOH/g resin was obtained. The resins were then poured into a metal paint can.

The acid number (abbreviated "AN"), hydroxyl number (abbreviated "OH#"), number average molecular weight (abbreviated "Mn") and glass transition temperature (abbreviated "Tg") of the polyesters are shown in Table 1. Acid number was determined using ASTM method D 1639. Hydroxyl number was determined by esterifying the resin by reaction with excess acetic anhydride in pyridine and then decomposing the unreacted anhydride with water. The resulting acetic acid is then titrated with a standard solution of KOH. The number of milligrams KOH which are equivalent to one gram of resin sample is reported as the hydroxyl number. Number average molecular weight was determined by gel permeation chromatography using a refractive index detector with polystyrene standards.

Residual xylene remaining in the resin from solvent processing could artificially lower the Tg measurement. To obtain a more accurate Tg, a resin sample was first subjected to preconditioning in a TGA (thermal gravimetric analysis) instrument. It was placed into a stainless steel DSC pan and heated under nitrogen atmosphere from room temperature to 150° C. at a rate of 5° C./min. The sample was then transferred to a differential scanning calorimeter with modulating capability (TA Instruments Q2000 MDSC with Universal software V4.3A). On the first heating cycle, the sample was heated under nitrogen atmosphere from –120° C. to 125° C. at a rate of 5° C./min. modulating at ±0.796° C./min. Next, it was cooled to –120° C. at 5° C/min. modulating at ±0.796° C./min. For the second heating cycle, the sample was heated under the same conditions as those used in the first heating cycle. The midpoint of the second heating cycle is reported as the Tg of the sample.

Each resin was reduced to 70 weight percent solids in n-butyl acetate (n-BuOAc). The solutions were then evaluated for color, clarity and solution viscosity. Platinum-Cobalt color was measured with a Gardco LICO 100 colorimeter in accordance with ASTM method D 1209. Color values ranging from 0 to 100 are colorless to very slight yellow color, respectively.

Clarity of the solutions was measured with a BYK-Gardner haze-gard plus instrument according to ASTM method D 1003, Method A, and is reported as percent haze.

Solution viscosity was determined using a Brookfield Model LV DV II+ Pro viscometer. Viscosity was measured in a 4 oz. jar at 100 rpm using spindle #63. Viscosity readings below 1000 centipoise are considered to be very low.

As shown in Table 1, polyesters P2, P3, and P4 have low color, good clarity and low viscosity. All are suitable for blending with a TSA resin and formulating into a high solids, solvent borne thermosetting coating.

TABLE 1

Polyester Resin Charge Weights (Grams) and Determined Resin Properties

|  | Polyester Formulation | | | |
|---|---|---|---|---|
|  | Comparative Example P1 | Example P2 | Example P3 | Example P4 |
|  | Mole % TMCD in Polyester | | | |
|  | 0 | 75 | 100 | 100 |
| Stage 1 | | | | |
| NPG[a],[b] | 435.38 | 95.84 | — | — |
| TMCD[a],[c] | — | 398.10 | 510.45 | 510.47 |
| TMP[d] | 35.91 | 36.53 | 36.71 | 36.71 |
| AD[e] | 293.41 | 258.28 | 248.36 | 248.37 |
| CHDA[g] | 345.69 | 304.31 | 292.62 | — |
| HHPA[h] | — | — | — | 262.02 |
| Fascat 4100 catalyst[f] | 1.14 | 1.12 | 1.12 | 1.09 |
| Xylene process solvent | 22.84 | 22.48 | 22.40 | 21.78 |
| Stage 2 | | | | |
| TMP | 35.91 | 36.53 | 36.71 | 36.71 |
| Total Charge | 1170.28 | 1153.19 | 1148.37 | 1117.15 |
| Minus Theo. Condensate | 142.00 | 124.70 | 119.81 | 89.22 |
| Yield | 1028.28 | 1028.49 | 1028.56 | 1027.93 |
| Determined Resin Properties | | | | |
| AN (mg KOH/g resin) | 5 | 8 | 5 | 4 |
| OH# (mg KOH/g resin) | 103 | 103 | 94 | 92 |
| $M_n$ (daltons) | 1959 | 1937 | 2106 | 2182 |
| $T_g$ (° C.) | −27.7 | −6.7 | 1.3 | 7.8 |
| Resin Properties at 70 wt. % in n-BuOAc | | | | |
| Platinum-Cobalt Color | 0 | 1 | 11 | 55 |
| Clarity (% Haze) | 0.83 | 0.53 | 0.98 | 1.55 |
| Viscosity, cP | 339 | 380 | 894 | 760 |

[a]Includes a glycol excess of 1 wt. % based on calculated charge weights
[b]2,2-Dimethyl-1,3-propanediol (Eastman)
[c]2,2,4,4-tetramethyl-1,3-cyclobutanediol (Eastman)
[d]Trimethylolpropane (Perstorp)
[e]Adipic acid (DuPont)
[f]Butylstannoic acid (Arkema)
[g]1,4-cyclohexanedicarboxylic acid
[h]Hexahydrophthalic anhydride Preparation of TSA/Aliphatic Polyester Blends—Examples B3, B4, B5, B7, B8, B9, B11, B12, and B13 illustrate blends of a TSA with the aliphatic polyesters of the invention, while examples B1, B2, B6, and B10 are comparative examples. The properties of the TSA/aliphatic polyester blends are listed in Table 2.

The aliphatic polyester resins were evaluated for compatibility with a commercially available TSA resin, MACRYNAL™ SM 515/70BAC (available from Cytec Surface Specialties). MACRYNAL™ SM 515 is a hydroxy functional acrylic that is crosslinkable with aliphatic polyisocyanates. This TSA resin is suggested for use by the manufacturer in air-drying and forced drying two pack high solids thermosetting coatings.

The TSA/polyester resin blends were evaluated at 70 weight percent solids in n-butyl acetate at TSA:polyester weight ratios of 85:15, 75:25 and 65:35. MACRYNAL™ SM 515 was supplied as a 70 weight percent solution in n-butyl acetate, and all of the polyester resins were reduced to 70 weight percent solids in n-butyl acetate. The appropriate amount of acrylic and polyester resin solutions were combined in a 4 oz. jar as indicated in Table 2. The solutions were then rolled at room temperature for 24 hours to thoroughly mix the components.

The viscosity of the TSA/polyester blends was determined using a Brookfield Model LV DV II+ Pro viscometer. Viscosity was measured in the 4 oz. jar at 20 rpm using spindle #63 and is reported in centipoise. A portion of each TSA/polyester blend was cast as a 10 mil wet film onto glass and force-dried for 7 hrs. at 80° C. (176° F.) then dried at room temperature drying for 4 days before evaluation.

The Tg of the blends was determined on samples of the dried cast films using a differential scanning calorimeter with modulating capability (TA Instruments Q2000 MDSC with Universal software V4.3A). On the first heating cycle, the sample was heated under helium atmosphere from −120° C. to 125° C. at a rate of 5° C./min. and modulating at ±0.531° C./40 sec. The sample then was quench-cooled with liquid nitrogen to −120° C. For the second heating cycle, the sample was heated under the same conditions as those used in the first heating cycle. The midpoint of the second heating cycle is reported as the Tg of the sample.

The compatibility of the aliphatic polyester with the TSA resin was determined by measuring the percent haze of the dried films according to ASTM method D 1003, Method A, using a BYK-Gardner HAZE-GARD PLUS™ instrument.

Table 2 shows that the viscosity of the TSA resin was lowered when blended with any of the polyesters. Viscosity decreases as the polyester content increases. In addition, comparative examples B2, B6, and B10 show the greatest reduction in Tg from the TSA alone, especially as the polyester content increases. Example blends B3, B4, B5, B7, B8, B9, B11, B12 and B13 have less impact on Tg. The combination of TMCD/HHPA in polyester P4 exhibits the greatest Tg retention. At 35% polyester content, Example blend B13 made from polyester P4 experienced only a 7° C. drop from the original Tg of the TSA versus a 35° C. drop for Comparative blend B10 containing polyester P1.

The compatibility of Example polyesters P2, P3 and P4 with the TSA, as indicated by percent haze were similar to blends made from Comparative polyester P1 and the TSA alone.

with Bonderite 1000 pretreatment. The rod was selected to achieve a 1.5±0.2 mil dry film thickness.

The coatings were force-dried 30 minutes at 250° F. (121.1° C.). With the exception of König pendulum hardness, all of the coating mechanical properties were determined after 21 days ambient aging. Specular gloss, distinctness of image, reflectance, color, hardness, flexibility, solvent resistance, chemical resistance and accelerated weathering (UVA and constant humidity) resistance of the coatings were determined and reported in Tables 4-9.

Dry film thickness (abbreviated "DFT") was measured with a Fischerscope MMS Multi Measuring System permascope (Fischer Technology) using the probe for ferrous substrates. Specular gloss was measured with a BYK-Gardner

TABLE 2

Properties of TSA/Aliphatic Polyester Blends

| | TSA/Polyester | | | | | | | | | | | | |
|---|---|---|---|---|---|---|---|---|---|---|---|---|---|
| | 100/0 | | 85/15 | | | 75/25 | | | | 65/35 | | | |
| | | | | | | Example Blend | | | | | | | |
| | B1[a] | B2[a] | B3 | B4 | B5 | B6[a] | B7 | B8 | B9 | B10[a] | B11 | B12 | B13 |
| | | | | | | Mole % TMCD in Polyester | | | | | | | |
| | — | 0 | 75 | 100 | 100 | 0 | 75 | 100 | 100 | 0 | 75 | 100 | 100 |
| Grams[b] | | | | | | | | | | | | | |
| Cytec Macrynal SM 515 TSA Resin | 100 | 85 | 85 | 85 | 85 | 75 | 75 | 75 | 75 | 65 | 65 | 65 | 65 |
| Comparative P1 | 0 | 15 | 0 | 0 | 0 | 25 | 0 | 0 | 0 | 35 | 0 | 0 | 0 |
| Example P2 | 0 | 0 | 15 | 0 | 0 | 0 | 25 | 0 | 0 | 0 | 35 | 0 | 0 |
| Example P3 | 0 | 0 | 0 | 15 | 0 | 0 | 0 | 25 | 0 | 0 | 0 | 35 | 0 |
| Example P4 | 0 | 0 | 0 | 0 | 15 | 0 | 0 | 0 | 25 | 0 | 0 | 0 | 35 |
| Properties | | | | | | | | | | | | | |
| Viscosity at 70 Wt. % Solids, cP | 2897 | 1566 | 1704 | 2040 | 1962 | 1254 | 1404 | 1908 | 1872 | 1044 | 1116 | 1644 | 1624 |
| $T_g$, ° C. | 37 | 25 | 32 | 33 | 34 | 13 | 25 | 31 | 32 | 2 | 22 | 27 | 30 |
| Haze, % | 0.11 | 0.22 | 0.14 | 0.13 | 0.11 | 0.38 | 0.40 | 0.11 | 0.18 | 0.12 | 0.22 | 0.26 | 0.17 |

[a]Comparative example.
[b]All resins are 70 wt. % solids in n-BuOAc.

Preparation of Polyurethane Coatings—White-pigmented polyurethane coatings were prepared from aliphatic polyester resins P1, P3, and P4 and are shown in Table 3. The resins were crosslinked with the triisocyanurate of 1,6-hexamethylene diisocyanate at a 1.1:1 NCO:OH ratio.

The Part A aliphatic polyester and pigment were added to a 500-mL stainless steel beaker. A cowles disperser was used to grind the resin and pigment to a 7+ Hegman for about 5 min. at 5000 rpm. The flow aid then was added and thoroughly mixed for a few minutes. Finally, the catalyst and solvent blend were added and thoroughly mixed. The total Part A mixture was transferred into a glass jar and rolled until needed. The Part B crosslinker was added to Part A and thoroughly mixed with a wooden tongue depressor then filtered through a Hayward PE 100 PN164 300M felt paint filter inside a medium mesh paper filter.

Coating viscosity was determined with a Gardco mini Ford dip cup #4. The initial viscosity measurement was made after combining and thoroughly mixing Part B with Part A. Viscosity was then measured every two hours thereafter and is shown in Table 3.

A wire wound rod was used to apply the coating to glass microscope slides and polished cold rolled steel test panels micro-TRI-gloss meter in accordance with ASTM method D 523. Distinctness of image (abbreviated "DOI") was measured with a BYK-Gardner wave-scan DOI instrument according to ASTM method E 430.

Color (CIE L* a* b*) and reflectance (CIE Y) values were measured with a HunterLab UltraScan PRO spectrophotometer in accordance with ASTM method E 313. Values were calculated using D65 illuminant and 10-degree observer. MEK double rub solvent resistance was performed with a 32 oz. ball peen hammer wrapped in 16 layers of cotton cheesecloth in accordance with ASTM method D1308. The number passed is reported as the last rub until any breakthrough of the coating to metal was observed. The test was run to a maximum of 300 double rubs with observations made on the left, middle and right side of the rubbed path.

Hardness was determined by three methods: a BYK-Gardner pendulum hardness tester using ASTM method D 4366; by pencil test using ASTM method D 3363; and with an Instron Wilson-Wolpert Tukon 2100B indentation hardness tester using ASTM method E 384. For pendulum hardness, the König method (abbreviated "KPH") is reported. KPH was followed over the course of 21 days. The first measurement, Day 1, was taken 24 hours after cure at 250° F. For pencil hardness, the value reported is the last pencil that did not cut through the coating to metal. Tukon hardness was measured on coatings applied to glass microscope slides. The instrument was set to run with a 10 g weight and 13 second indent time using 20× magnification. Tukon hardness is reported using the Knoop scale (abbreviated "HK").

Flexibility was measured as impact resistance with a Gardco Model 172 universal impact tester in accordance with ASTM method D 2794. The values reported are the last impact to not produce any crack in the coating film or delamination of the coating from the substrate.

Resistance to a 50% solution of sulfuric acid ($H_2SO_4$) was performed under ambient conditions for 36 days and measured according to ASTM method D 1308. A drop of the acid solution was placed onto the coating, covered with a watch glass and sealed with paraffin wax. Test areas were rinsed with water before inspecting for blister formation.

To gage outdoor durability, the coatings were subjected to QUVA (340 nm) accelerated weathering using a QUV/SE instrument (Q-Lab). The test condition for 'general metal' coatings per ASTM method D 4587 was selected that includes 4 hours UV exposure at 60° C. followed by 4 hours condensation at 50° C. Test panel edges and back were taped to protect against rust formation. Measurements were taken 2 hours into the UV light cycle to ensure a dry surface and consistency of measurement. Test panels were rotated after each observation interval. The coatings were tested for gloss retention (20° and 60° per ASTM method D 523) and color change (Hunter $\Delta E^*$ and Yellowness Index, ASTM method E 308 and ASTM method D 1925). The results are shown in Tables 5 and 6.

The outdoor durability of a coating also was determined by testing its water resistance using controlled condensation as described in ASTM method D 4585. The coatings were placed in a Cleveland condensing type humidity cabinet (Q-Lab Model QCT/ADO) for continuous 60° C. misting with deionized water. The edges and back of the test panels were taped to protect against rust formation. They were rotated after each observation interval. The coatings were evaluated for gloss retention (20° and 60° per ASTM D 523) and degree of blistering (using ASTM method D 714). The results are shown in Tables 7, 8 and 9.

Table 3 shows that example coatings C2 and C3 show similar pot lives as comparative example C1 (based on NPG glycol as the diol). Coating mechanical properties are presented in Table 4.

Examples C2 and C3 exhibit higher gloss, DOI, and reflectance than comparative example C1. Color is relatively similar for all of the coatings. Examples C2 and C3 also have a more uniform and brilliant appearance as indicated by the higher gloss, DOI and reflectance values.

MEK double rub solvent resistance was higher across the coating surface for examples C2 and C3 than comparative example C1. In particular, the combination of TMCD/CHDA in example C2 showed no breakthrough of the coating to the substrate.

Hardness, as measured by pencil, Tukon and König pendulum tests, is greater for examples C2 and C3. In addition, examples C2 and C3 display similar flexibility to comparative example C1. Examples C2 and C3 were unaffected after 36 days exposure to $H_2SO_4$ solution, whereas comparative example C1 blistered.

After ~3500 hours QUVA (340 nm) accelerated weathering exposure, examples C2 and C3 had greater gloss retention than comparative example C1 (see Table 5). Gloss retention of examples C2 and C3 was about 4.5 times longer. Examples C2 and C3 also exhibited a Hunter $\Delta E^*$ shift and Yellow Index shift of only one unit over the entire test period (see Table 6).

Examples C2 and C3 had greater gloss retention with little or no blister development than comparative example C1 when subjected to Cleveland humidity testing (see Tables 7, 8 and 9). In particular, example C3 retained 73% of its original 20° gloss after 10,000 hours exposure with no blister formation.

TABLE 3

Comparative and Example Polyurethane Coating Formulation Weights (Grams) and Pot Life

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| | 0 | 100 | 100 |
| Part A - Grind | | | |
| Polyester resin (70 wt. % in n-BuOAc) | 76.23 | 76.23 | 76.45 |
| Ti-Pure R960 TiO$_2$ pigment[a] | 51.89 | 51.89 | 51.89 |
| Part A - Let Down | | | |
| BYK-300[b] (10 wt. % in n-BuOAc) | 2.59 | 2.59 | 2.59 |
| Fascat 4202[c] catalyst (1 wt. % in n-BuOAc) | 0.82 | 0.82 | 0.82 |
| Solvent blend (45/45/10 Xylene/MAK/EEP) | 40.99 | 40.99 | 40.94 |
| Total Part A | 172.52 | 172.52 | 172.70 |
| Part B | | | |
| Desmodur N 3390 BA/SN[d] (90 wt. % in 1/1 n-BuOAc/solvent naptha 100) | 27.48 | 27.48 | 27.30 |
| Total Parts A + B | 200.00 | 200.00 | 200.00 |

TABLE 3-continued

Comparative and Example Polyurethane Coating Formulation Weights (Grams) and Pot Life

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| | 0 | 100 | 100 |
| Pot Life (Coating Viscosity, sec.) | | | |
| 0 Hours | 9.2 | 11.6 | 9.9 |
| 1 Hour | 10.0 | 12.1 | 10.2 |
| 2 Hours | 11.1 | 12.0 | 10.3 |
| 3 Hours | — | 12.4 | — |
| 4 Hours | 13.1 | 12.9 | 11.6 |
| 5 Hours | 14.7 | — | — |
| 6 Hours | 17.8 | — | 19.4 |

(a) DuPont Titanium Technologies.
(b) BYK-Chemie.
(c) Arkema (dibutyltindilaurate).
(d) Bayer MaterialScience (aliphatic polyisocyanate HDI trimer).

TABLE 4

Comparative and Example Polyurethane Coating Properties

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| | 0 | 100 | 100 |
| Gloss | | | |
| ~20° | 72 | 79 | 81 |
| ~60° | 87 | 88 | 90 |
| DOI | 90 | 93 | 93 |
| Reflectance (Y-value) | 88 | 92 | 91 |
| Color | | | |
| L* | 95.33 | 96.69 | 96.23 |
| a* | −1.24 | −1.08 | −1.11 |
| b* | −0.02 | −0.31 | −0.41 |
| MEK Dbl Rubs (# passed) | | | |
| Left | 285 | 300+ | 273 |
| Middle | 300+ | 300+ | 300+ |
| Right | 133 | 300+ | 289 |
| Pencil Hardness | 1H | 3H | 3H |
| Tukon Hardness (HK) | <1 | 13.9 | 15.7 |
| König Pendulum Hardness (sec.) | | | |
| Day 1 | 16 | 146 | 157 |
| Day 2 | 17 | 157 | 167 |
| Day 7 | 17 | 158 | 169 |
| Day 14 | 17 | 162 | 171 |
| Day 21 | 17 | 161 | 170 |
| Impact Resistance (in.-lb.) | | | |
| Forward | 150 | 150 | 174 |
| Reverse | 126 | 84 | 78 |
| 50% $H_2SO_4$ Resistance | | | |
| Appearance after 36 days | Moderate blistering. | No effect. | No effect. |

TABLE 5

QUVA Accelerated Weathering Gloss Retention of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| Hours Exposure | 0 | 100 | 100 |
| | 20° Gloss | | |
| 0 | 70.5 | 80.4 | 81.9 |
| 250 | 70.3 | 78.0 | 82.8 |
| 500 | 67.9 | 79.1 | 82.8 |
| 750 | 14.1 | 77.8 | 82.5 |
| 1000 | — | 71.8 | 79.5 |
| 1250 | — | 64.5 | 81.6 |
| 1500 | — | 54.4 | 68.4 |
| 1750 | — | 43.1 | 65.1 |

TABLE 5-continued

QUVA Accelerated Weathering Gloss Retention of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| Hours Exposure | Mole % TMCD in Polyester | | |
| | 0 | 100 | 100 |
| 2000 | — | 37.8 | 64.1 |
| 2244 | — | 29.9 | 48.7 |
| 2478 | — | 24.6 | 37.0 |
| 2728 | — | 18.3 | 23.3 |
| 2978 | — | 17.4 | 24.4 |
| 3228 | — | 20.0 | 22.7 |
| 3478 | — | 13.6 | 11.3 |
| 60° Gloss | | | |
| 0 | 85.9 | 87.4 | 90.5 |
| 250 | 86.0 | 85.5 | 90.4 |
| 500 | 85.1 | 86.6 | 90.2 |
| 750 | 48.9 | 87.4 | 90.7 |
| 1000 | — | 86.6 | 89.1 |
| 1250 | — | 85.0 | 89.7 |
| 1500 | — | 81.9 | 84.2 |
| 1750 | — | 77.2 | 84.1 |
| 2000 | — | 75.5 | 84.2 |
| 2244 | — | 71.9 | 78.6 |
| 2478 | — | 67.0 | 71.4 |
| 2728 | — | 61.0 | 66.1 |
| 2978 | — | 61.4 | 64.1 |
| 3228 | — | 63.8 | 58.3 |
| 3478 | — | 56.6 | 51.1 |

TABLE 6

QUVA Accelerated Weathering Color Change of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| Hours Exposure | Mole % TMCD in Polyester | | |
| | 0 | 100 | 100 |
| ΔE | | | |
| 0 | 0.0 | 0.0 | 0.0 |
| 250 | 0.5 | 0.2 | 0.3 |
| 500 | 0.5 | 0.4 | 0.2 |
| 750 | 0.4 | 0.3 | 0.2 |
| 1000 | — | 0.6 | 0.4 |
| 1250 | — | 0.4 | 0.3 |
| 1500 | — | 0.8 | 0.9 |
| 1750 | — | 0.8 | 0.6 |
| 2000 | — | 0.6 | 0.5 |
| 2244 | — | 0.7 | 0.7 |
| 2478 | — | 0.8 | 0.8 |
| 2728 | — | 0.8 | 0.9 |
| 2978 | — | 1.0 | 1.0 |
| 3228 | — | 0.9 | 0.8 |
| 3478 | — | 1.0 | 0.9 |
| Yellow Index | | | |
| 0 | −1.9 | −1.8 | −1.9 |
| 250 | −1.5 | −1.7 | −1.6 |
| 500 | −1.4 | −1.7 | −1.7 |

TABLE 6-continued

QUVA Accelerated Weathering Color Change of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| Hours Exposure | Mole % TMCD in Polyester | | |
| | 0 | 100 | 100 |
| 750 | −1.5 | −1.7 | −1.7 |
| 1000 | — | −1.6 | −1.6 |
| 1250 | — | −1.5 | −1.5 |
| 1500 | — | −1.4 | −1.3 |
| 1750 | — | −1.5 | −1.6 |
| 2000 | — | −1.4 | −1.5 |
| 2244 | — | −1.2 | −1.2 |
| 2478 | — | −1.3 | −1.2 |
| 2728 | — | −1.3 | −1.2 |
| 2978 | — | −1.1 | −1.1 |
| 3228 | — | −1.2 | −0.9 |
| 3478 | — | −1.0 | −1.0 |

TABLE 7

Cleveland Humidity Accelerated Weathering 20° Gloss Retention of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| | 0 | 100 | 100 |
| Hours Exposure | 20° Gloss | | |
| 0 | 65.5 | 80.3 | 81.3 |
| 24 | 65.9 | 80.3 | 82.1 |
| 48 | 62.9 | 80 | 82 |
| 148 | 61.8 | 79.7 | 81.9 |
| 288 | 57.6 | 80.6 | 82.2 |
| 456 | 45.4 | 80.1 | 81.6 |
| 600 | 46.3 | 80.4 | 81.9 |
| 768 | 39.4 | 79.5 | 81.8 |
| 936 | 34.5 | 76.8 | 80.3 |
| 1104 | 28.2 | 77.9 | 80.6 |
| 1272 | 14.4 | 77.2 | 80.2 |
| 1532 | 13 | 77.1 | 79.6 |
| 1700 | — | 76.3 | 79.7 |
| 1868 | — | 77.2 | 80.3 |
| 2036 | — | 77.1 | 80.9 |
| 2252 | — | 74.9 | 79.7 |
| 2500 | — | 74.5 | 79.1 |
| 2740 | — | 75.3 | 79.1 |
| 3004 | — | 73.7 | 80.1 |
| 3100 | — | 75.4 | 79.8 |
| 3316 | — | 72.8 | 79.6 |
| 3580 | — | 71.2 | 79.8 |
| 3820 | — | 64.7 | 79.7 |
| 4080 | — | 66.9 | 78.7 |
| 4330 | — | 59.7 | 78.8 |
| 4640 | — | 54.1 | 78.4 |
| 4928 | — | 50.1 | 78.4 |
| 5168 | — | 42.6 | 74.8 |
| 5418 | — | 41.4 | 76.1 |
| 5638 | — | 37 | 75.6 |
| 5854 | — | 29.2 | 76.3 |
| 6142 | — | 28.5 | 73.1 |
| 6430 | — | 14.1 | 70.6 |

TABLE 7-continued

Cleveland Humidity Accelerated Weathering 20° Gloss Retention of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| Hours Exposure | 0 | 100 | 100 |
| | 20° Gloss | | |
| 6622 | — | — | 71.6 |
| 6910 | — | — | 72.7 |
| 7390 | — | — | 69.4 |
| 7678 | — | — | 69.7 |
| 8086 | — | — | 64.1 |
| 9326 | — | — | 60.6 |
| 9734 | — | — | 52.4 |
| 10046 | — | — | 59.1 |

TABLE 8

Cleveland Humidity Accelerated Weathering 60° Gloss Retention of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| Hours Exposure | 0 | 100 | 100 |
| | 60° Gloss | | |
| 0 | 85.2 | 87.4 | 89.8 |
| 24 | 85.3 | 87.3 | 89.8 |
| 48 | 84.1 | 87.4 | 89.6 |
| 148 | 83.8 | 87.6 | 89.7 |
| 288 | 81.7 | 87.5 | 89.7 |
| 456 | 69.3 | 87.3 | 89.6 |
| 600 | 68.5 | 87.3 | 90.0 |
| 768 | 62.8 | 87.5 | 90.2 |
| 936 | 56.7 | 85.5 | 89.0 |
| 1104 | 53.7 | 85.2 | 88.0 |
| 1272 | 33.1 | 85.7 | 88.5 |
| 1532 | 28.0 | 84.9 | 88.5 |
| 1700 | — | 84.8 | 87.9 |
| 1868 | — | 85.4 | 89.5 |
| 2036 | — | 86.2 | 89.1 |
| 2252 | — | 84.6 | 88.3 |
| 2500 | — | 84.9 | 88.6 |
| 2740 | — | 85.1 | 88.1 |
| 3004 | — | 85.5 | 89.0 |
| 3100 | — | 85.5 | 88.6 |
| 3316 | — | 84.6 | 88.4 |
| 3580 | — | 84.6 | 90.3 |
| 3820 | — | 81.0 | 88.9 |
| 4080 | — | 82.4 | 89.0 |
| 4330 | — | 79.3 | 87.9 |
| 4640 | — | 77.3 | 88.4 |
| 4928 | — | 74.7 | 88.0 |
| 5168 | — | 70.3 | 87.5 |
| 5418 | — | 70.9 | 85.9 |
| 5638 | — | 66.4 | 86.5 |
| 5854 | — | 60.7 | 86.7 |
| 6142 | — | 61.5 | 84.6 |
| 6430 | — | 48.9 | 84.8 |
| 6622 | — | — | 84.9 |
| 6910 | — | — | 84.8 |
| 7390 | — | — | 82.5 |
| 7678 | — | — | 82.9 |
| 8086 | — | — | 80.2 |
| 9326 | — | — | 77.8 |
| 9734 | — | — | 77.9 |
| 10046 | — | — | 78.4 |

TABLE 9

Cleveland Humidity Accelerated Weathering Blister Rating of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| Hours Exposure | 0 | 100 | 100 |
| | Blister Rating (Size/Density) | | |
| 0 | None/None | None/None | None/None |
| 24 | None/None | None/None | None/None |
| 48 | None/None | None/None | None/None |
| 148 | None/None | None/None | None/None |
| 288 | 8/Medium | None/None | None/None |
| 456 | 6/Medium | None/None | None/None |
| 600 | 4/Medium | None/None | None/None |
| 768 | 4/Dense | None/None | None/None |
| 936 | 4/Dense | None/None | None/None |
| 1104 | 4/Dense | None/None | None/None |
| 1272 | 2/Dense | None/None | None/None |
| 1532 | 2/Dense | None/None | None/None |
| 1700 | — | None/None | None/None |
| 1868 | — | None/None | None/None |
| 2036 | — | None/None | None/None |
| 2252 | — | None/None | None/None |
| 2500 | — | None/None | None/None |
| 2740 | — | None/None | None/None |
| 3004 | — | None/None | None/None |
| 3100 | — | None/None | None/None |
| 3316 | — | None/None | None/None |
| 3580 | — | None/None | None/None |
| 3820 | — | None/None | None/None |
| 4080 | — | None/None | None/None |
| 4330 | — | None/None | None/None |
| 4640 | — | None/None | None/None |
| 4928 | — | None/None | None/None |
| 5168 | — | 6/Few | None/None |
| 5418 | — | 6/Few | None/None |
| 5638 | — | 6/Few | None/None |
| 5854 | — | 6/Few | None/None |
| 6142 | — | 6/Few | None/None |
| 6430 | — | 6/Few | None/None |
| 6622 | — | — | None/None |
| 6910 | — | — | None/None |
| 7390 | — | — | None/None |
| 7678 | — | — | None/None |
| 8086 | — | — | None/None |
| 9326 | — | — | None/None |

TABLE 9-continued

Cleveland Humidity Accelerated Weathering Blister Rating of Comparative and Example Polyurethane Coatings

| | Coating Formulation | | |
|---|---|---|---|
| | Comparative Example C1 | Example C2 | Example C3 |
| | Polyester Formulation from Example 1 | | |
| | P1 | P3 | P4 |
| | Mole % TMCD in Polyester | | |
| Hours Exposure | 0 | 100 | 100 |
| | Blister Rating (Size/Density) | | |
| 9734 | — | — | None/None |
| 10046 | — | — | None/None |

We claim:

1. A curable, aliphatic polyester, consisting of:
   i. diacid residues, comprising at least 90 mole percent, based on the total moles of diacid residues, of the residues of at least one aliphatic diacid, said aliphatic dicacid comprising about 50 to 100 mole percent of a cycloaliphatic dicarboxylic acid;
   ii. diol residues, comprising about 50 to 100 mole percent of the residues of 2,2,4,4-tetramethyl-1,3-cyclobutanediol based on the total moles of diol residues; and
   iii. about 3 to about 30 mole percent of the residues of at least one polyol chosen from trimethylolpropane, pentaerythritol, trimethylolethane, erythritol, threitol, dipentaerythritol, sorbitol, and glycerine, based on the total moles of diol and polyol residues;
   wherein said curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester.

2. The curable, aliphatic polyester according to claim 1 wherein said diacid residues comprise about 50 to about 85 mole percent of the residues of 1,4-cyclohexanedicarboxylic acid, hexahydrophthalic anhydride, or a mixture thereof and about 15 to 50 mole percent of the residues of adipic acid; and said diol residues comprise about 50 to 0 mole percent of the residues of neopentyl glycol.

3. The curable, aliphatic polyester according to claim 2 wherein said diacid residues comprise about 50 mole percent of the residues of hexahydrophthalic anhydride and about 50 mole percent of the residues of adipic acid; and said diol residues comprise about 75 to 100 mole percent of the residues of 2,2,4,4-tetramethyl-1,3-cyclobutanediol and about 25 to 0 mole percent of the residues of neopentyl glycol.

4. The curable, aliphatic polyester according to claim 1 wherein said diacid residues comprise about 50 to about 85 mole percent of the residues of at least one cycloaliphatic dicarboxylic acid chosen from 1,4-cyclohexanedicarboxylic acid, 1,3-cyclohexanedicarboxylic acid, hexahydrophthalic anhydride, and about 50 to about 15 mole percent of the residues at least one acyclic aliphatic dicarboxylic acid chosen from adipic acid, dodecanedioic acid, sebacic acid, azelaic acid, maleic acid, fumaric acid, succinic acid, and glutaric acid; and said diol residues comprise about 50 to 0 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

5. The curable, aliphatic polyester according to claim 1 which has a hydroxyl number of about 30 to about 250 mg KOH/g of polyester, an acid number of about 2 to about 15 mg KOH/g of polyester, a number average molecular weight of about 700 to about 7000 daltons, and a Tg of about −20 to about 20° C.

6. A curable, aliphatic polyester, consisting of:
   i. diacid residues, consisting essentially of about 50 to 100 mole percent of the residues of 1,4-cyclohexanedicarboxylic acid, hexahydrophthalic anhydride, or a mixture thereof and about 50 to 0 mole percent of the residues of adipic acid, based on the total moles of diacid residues;
   ii. diol residues, consisting essentially of about 75 to 100 mole percent of the residues of 2,2,4,4-tetramethyl-1,3-cyclobutanediol; and
   iii. about 3 to about 30 mole percent of the residues of trimethylolpropane, based on the total moles of diol and polyol residues;
   wherein said curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester.

7. A thermosetting coating composition, comprising:
   (A). about 50 to about 90 weight percent, based on the total weight of (A) and (B) of at least one curable, aliphatic polyester, consisting of
      i. diacid residues, comprising at least 90 mole percent, based on the total moles of diacid residues, of the residues of at least one aliphatic diacid, said aliphatic dicacid comprising about 50 to 100 mole percent of a cycloaliphatic dicarboxylic acid
      ii. diol residues, comprising about 50 to 100 mole percent of the residues of 2,2,4,4-tetramethyl-1,3-cyclobutanediol; and
      iii. about 3 to about 30 mole percent of the residues of at least one polyol chosen from trimethylolpropane, pentaerythritol, trimethylolethane, erythritol, threitol, dipentaerythritol, sorbitol, and glycerine, based on the total moles of diol and polyol residues;
      wherein said curable, aliphatic polyester has a number average molecular weight of about 300 to about 10,000 daltons, a glass transition temperature of about −35° C. to about 35° C., a hydroxyl number of about 20 to about 450 mg KOH/g of polyester, and an acid number of 0 to about 80 mg KOH/g of polyester;
   (B). about 10 to about 50 weight percent, based on the total weight of (A) and (B) of a crosslinker comprising at least one compound reactive with a carboxylic acid or a hydroxyl group; and
   (C). about 10 to about 60 weight percent, based on the total weight of (A), (B), and (C) of at least one nonaqueous solvent.

8. The coating composition according to claim 7 wherein said diacid residues comprise about 50 to about 85 mole percent of the residues of 1,4-cyclohexanedicarboxylic acid, hexahydrophthalic anhydride, or a mixture thereof, and about 50 to about 15 mole percent of the residues of adipic acid; and said diol residues comprise about 50 to 0 mole percent of the residues of neopentyl glycol.

9. The coating composition according to claim 7 wherein said diacid residues comprise about 50 mole percent of the residues of hexahydrophthalic anhydride and about 50 mole percent of the residues of adipic acid; and said diol residues comprise about 75 to 100 mole percent of the residues of 2,2,4,4-tetramethyl-1,3-cyclobutanediol and about 25 to 0 mole percent of the residues of neopentyl glycol.

10. The coating composition according to claim 7 which has a hydroxyl number of about 30 to about 250 mg KOH/g of polyester, an acid number of about 2 to about 15 mg KOH/g of polyester, a number average molecular weight of about 700 to about 7000 daltons, and a Tg of about −20 to about 20° C.

11. The coating composition according to claim 7 wherein said crosslinker comprises at least one compound chosen from melamines, isocyanates, and isocyanurates.

12. The coating composition according to claim 11 wherein said crosslinker comprises at least one melamine compound chosen from hexamethoxy-methylmelamine, tetramethoxymethylbenzoguanamine, tetramethoxymethylurea, and mixed butoxy/methoxy substituted melamines.

13. The coating composition according to claim 11 wherein said crosslinker comprises isocyanurates of 1,6-hexamethylene diisocyanate, the biuret of 1,6-hexamethylene diisocyanate, the trimer of 1,6-hexamethylene diisocyanate, or combinations thereof.

14. The coating composition according to claim 7 wherein said nonaqueous solvent comprises benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof.

15. A shaped object coated with the coating composition of claim 7.

* * * * *